(12) United States Patent
Zheng et al.

(10) Patent No.: US 11,477,255 B2
(45) Date of Patent: *Oct. 18, 2022

(54) HYBRID NETWORK SYSTEM, COMMUNICATION METHOD AND NETWORK NODE

(71) Applicant: Tsinghua University, Beijing (CN)

(72) Inventors: Weimin Zheng, Beijing (CN); Wenguang Chen, Beijing (CN); Wei Xue, Beijing (CN); Jidong Zhai, Beijing (CN); Kang Chen, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 64 days.

This patent is subject to a terminal disclaimer.

(21) Appl. No.: 16/938,075

(22) Filed: Jul. 24, 2020

(65) Prior Publication Data

US 2020/0358834 A1 Nov. 12, 2020

Related U.S. Application Data

(63) Continuation of application No. 15/319,775, filed as application No. PCT/CN2015/089087 on Sep. 7, 2015, now Pat. No. 10,778,738.

(30) Foreign Application Priority Data

Sep. 9, 2014 (CN) .......................... 201410455171.3

(51) Int. Cl.
*G06F 15/16* (2006.01)
*H04L 65/611* (2022.01)
(Continued)

(52) U.S. Cl.
CPC ........ *H04L 65/611* (2022.05); *H04L 12/1836* (2013.01); *H04L 67/02* (2013.01);
(Continued)

(58) Field of Classification Search
CPC ............. H04L 61/2015; H04L 12/1836; H04L 65/4076; H04L 67/02; H04L 67/1095; H04L 67/1097; G06F 11/2094
See application file for complete search history.

(56) References Cited

U.S. PATENT DOCUMENTS 7,783,600 B1 * 8/2010 Spertus ............... G06F 16/1837
707/622
9,229,782 B2 * 1/2016 Aho ...................... G06F 9/5072
(Continued)

*Primary Examiner* — Dustin Nguyen
*Assistant Examiner* — Hao H Nguyen
(74) *Attorney, Agent, or Firm* — IPRO, PLLC; Na Xu

(57) ABSTRACT

A hybrid network system, a communication method and a network node are provided. The hybrid network system includes a combined network system architecture of a point-to-point network and a broadcast network, the point-to-point network is provided with a plurality of point-to-point channels, and each network node can send a message to a corresponding network node or receive the message from the corresponding network node through the point-to-point channel; the broadcast network is provided with a plurality of broadcast channels, and each broadcast channel can only have one sender at most at the same time, but can have a plurality of receivers; at least a part of network nodes have the capability of sending messages to be broadcast, at least a part of network nodes have the capability of receiving the broadcast messages, and at least some network nodes are configured to select the broadcast network or the point-to-point network at least according to communication tasks to be executed per se to complete the communication tasks to be executed. Preferably, each network node has the capability of sending and receiving the broadcast message. The
(Continued)

hybrid network system of the embodiment of the present invention has high flexibility and high communication performance.

4 Claims, 2 Drawing Sheets

(51) Int. Cl.
| | | |
|---|---|---|
| *H04L 12/18* | (2006.01) | |
| *H04L 67/02* | (2022.01) | |
| *H04L 67/1095* | (2022.01) | |
| *H04L 67/1097* | (2022.01) | |
| *H04L 61/5014* | (2022.01) | |

(52) U.S. Cl.
CPC ...... *H04L 67/1095* (2013.01); *H04L 67/1097* (2013.01); *H04L 61/5014* (2022.05)

(56) References Cited

U.S. PATENT DOCUMENTS

| | | | | |
|---|---|---|---|---|
| 9,807,132 | B2* | 10/2017 | Archer | H04L 65/403 |
| 2002/0121555 | A1* | 9/2002 | Cipolla | G06F 15/17381 |
| | | | | 236/49.1 |
| 2004/0078493 | A1* | 4/2004 | Blumrich | G06F 9/52 |
| | | | | 709/250 |
| 2008/0092146 | A1* | 4/2008 | Chow | G06F 15/173 |
| | | | | 719/313 |
| 2013/0173675 | A1* | 7/2013 | Archer | G06F 9/522 |
| | | | | 708/102 |
| 2016/0285981 | A1* | 9/2016 | Morton | G06Q 30/0205 |
| 2017/0188397 | A1* | 6/2017 | Liang | H04L 67/1046 |

\* cited by examiner

|  | With broadcast | No broadcast |
| --- | --- | --- |
| Barrier | O(Log(P)) | O(Log(P)) |
| Bcast | O(Log(P)) | O(1) |
| Allgather | O(Log(P)) | O(Log(P)) |
| Gather | O(Log(P)) | O(Log(P)) |
| Reduce | O(Log(P)) | O(Log(P)) |
| Allreduce | O(Log(P)) | O(Log(P))* |
| Alltoall | O(P) | O(Log(P)) |
| Scatter | O(Log(P)) | O(1) |

HYBRID NETWORK SYSTEM, COMMUNICATION METHOD AND NETWORK NODE

FIELD OF THE INVENTION

The present invention generally relates to data processing, in particular to a hybrid network system, a communication method and a network node, which can be applied to, for example, parallel computation, data centers, distributed file systems and the like.

BACKGROUND OF THE INVENTION

Many computer fields highly depending on communication have the demands of improving the communication performance, for example, parallel computation, data centers and distributed file systems, etc.

Parallel computation is an evolving computer field, and the parallel computation refers to executing the same task on a plurality of processors (the task is decomposed and specially adjusted) to obtain a result more quickly. The parallel computation is based on the following facts: a process of solving a problem can be generally divided into a plurality of smaller tasks, and these smaller tasks can be executed simultaneously by coordination.

A parallel computer executes a parallel algorithm. The parallel algorithm is decomposed into many small parts of tasks, these small parts of tasks are executed on many different processing devices and are finally summarized together to obtain a data processing result. In the specification, the numerous processing devices for executing the small parts of a parallel program are called "computing nodes", and the parallel computer is composed of the computing nodes and other processing nodes (e.g., input/output nodes and service nodes).

In order to execute the parallel program, the nodes of the parallel computer often need to carry out a lot of data communication. Typically, the common mode of the nodes for carrying out the data communication is message passing.

As one of the main components of the parallel program, the communication influences the performance of the parallel program to a larger extent.

Currently, MPI ("message passing interface (Message Passing Interface)") is a fact standard for communication of the computing nodes executing the parallel program on the parallel computer. The MPI is an existing parallel communication library and is a module of computer program instructions which carrie out data communication on the parallel computer. The MPI is released by an MPI forum, and the MPI forum is an open group and has many organization representatives that define and maintain the MPI standard.

A communication function of the parallel program mainly includes a point-to-point communication function and a collective communication function. The point-to-point communication function can completely execute the data exchange between two parallel processes, including blocking communication (MPI_Send, MPI_Recv) and non-blocking communication (MPI_Isend, MPI_Irecv) and the like; and the collective communication function can realize the data exchange of a plurality of processes (process groups), including MPI_Barrier, MPI_Bcast, MPI_Allgather, MPI_Alltoall or the like. In this specification, the term "point-to-point communication function" and the term "point-to-point operation" are interchangeable, and the "collective communication function" are interchangeable with the term "collective operation" (also referred to as "collective action", "group communication" and the like in the field sometimes).

Inventors have found that the expansion of the parallel computing capability of the parallel computer is often limited by the data communication performance. With the expansion of the scale, the proportion of communication time in total execution time increases, which is mainly caused by the communication time of the collective communication function, for example, the computation time only occupies 39.2% in 2048 processes, and to improve the expandability of the application, the communication performance of the system, particularly the collective communication performance, must be improved.

The inventors have also found that in an operating system mirror broadcast application of a cloud platform of the data center and a file backup application of the distributed file system, the communication performance also needs to be improved.

SUMMARY OF THE INVENTION

In view of the above conditions, the present invention is proposed.

Various embodiments of the present invention provide the following technical solutions:

according to one aspect of the present invention, a hybrid network system is provided, including: a combined network system architecture of a point-to-point network and a broadcast network, wherein the point-to-point network is provided with a plurality of point-to-point channels, each network node can send a message to a corresponding network node or receive the message from the corresponding network node through the point-to-point channel, and wherein the broadcast network is provided with a plurality of broadcast channels, and each broadcast channel can only have one sender at most at the same time, but can have a plurality of receivers; at least a part of network nodes have the capability of sending messages to be broadcast through the broadcast channels, at least a part of network nodes have the capability of receiving the broadcast messages, wherein at least some network nodes are configured to select between the broadcast channels and the point-to-point channels at least according to communication tasks to be executed per se and complete the communication tasks to be executed through the selected channels.

According to another aspect of the present invention, a communication method in a hybrid network system is provided, the hybrid network system can include a combined network system architecture of a point-to-point network and a broadcast network, wherein the point-to-point network is provided with a plurality of point-to-point channels, each network node can send a message to a corresponding network node or receive the message from the corresponding network node through the point-to-point channel, and wherein the broadcast network is provided with a plurality of broadcast channels, and each broadcast channel can only have one sender at most at the same time, but can have a plurality of receivers; at least a part of network nodes have the capability of sending messages to be broadcast through the broadcast channels, at least a part of network nodes have the capability of receiving the broadcast messages, and the communication method can include: at least some network nodes select between the broadcast channels and the point-to-point channels at least according to communication tasks to be executed and complete the communication tasks to be executed through the selected channels.

According to yet another aspect of the present invention, a network node in a hybrid network system is provided, the hybrid network system can include a combined network system architecture of a point-to-point network and a broadcast network, the point-to-point network is provided with a plurality of point-to-point channels, the broadcast network is provided with a plurality of broadcast channels, and each broadcast channel can only have one sender at most at the same time, but can have a plurality of receivers; the network node can send a message to a corresponding network node or receive the message from the corresponding network node through the point-to-point channel, and has the capability of sending a message to be broadcast and receiving the broadcast message through the broadcast channel, and the network node is configured to select between the broadcast channels and the point-to-point channels at least according to a communication task to be executed per se and complete the communication task to be executed through the selected channel.

By adopting the hybrid network system according to the embodiments of the present invention, the network architecture simultaneously provided with the point-to-point network and the broadcast network can select the point-to-point network or the broadcast network to complete communication according to the communication needing to be executed for the specific task to be executed, therefore compared with the traditional simple point-to-point network architecture, flexibility can be brought, the communication times are decreased, the necessary communication time is shortened, the pressure of point-to-point communication network resources is relieved, and the application expandability is improved.

A parallel computer adopting the hybrid network architecture according to the embodiments of the present invention and a collective operation execution method adopt the system structure of the point-to-point network and the broadcast network, and at least a part of broadcast or multicast communication in a collective operation is completed by at least a part of broadcast networks, therefore the collective communication performance can be significantly improved, and the expandability of parallel computation is improved.

With the hybrid network applied to a data center according to the embodiments of the present invention, a mirror can be sent through the broadcast network, so as to greatly reduce the network overhead in virtual machine deployment.

With the hybrid network applied to a distributed file system according to the embodiments of the present invention, at least three transcripts can be completed by transmitting file contents through the broadcast network at one time, so that the communication performance is greatly improved, and the computing resources are saved.

BRIEF DESCRIPTION OF THE DRAWINGS

From the following detailed description of the embodiments of the present invention in combination with the accompany drawings, these and/or other aspects and advantages of the present invention will become clearer and more understandable, wherein.

DETAILED DESCRIPTION OF THE EMBODIMENTS

In order that those skilled in the art can better understand the present invention, a further detailed illustration of the present invention will be given below in combination with the accompany drawings and specific implementations.

In the present application, a "point-to-point network" or a "point-to-point communication network" refers to that data are transmitted among computers or communication devices in a point-to-point manner. A star network and a ring network adopt this transmission mode.

A "broadcast network" refers to that data are transmitted in a public medium. A wireless network and a bus network belong to this type.

Figure 1:
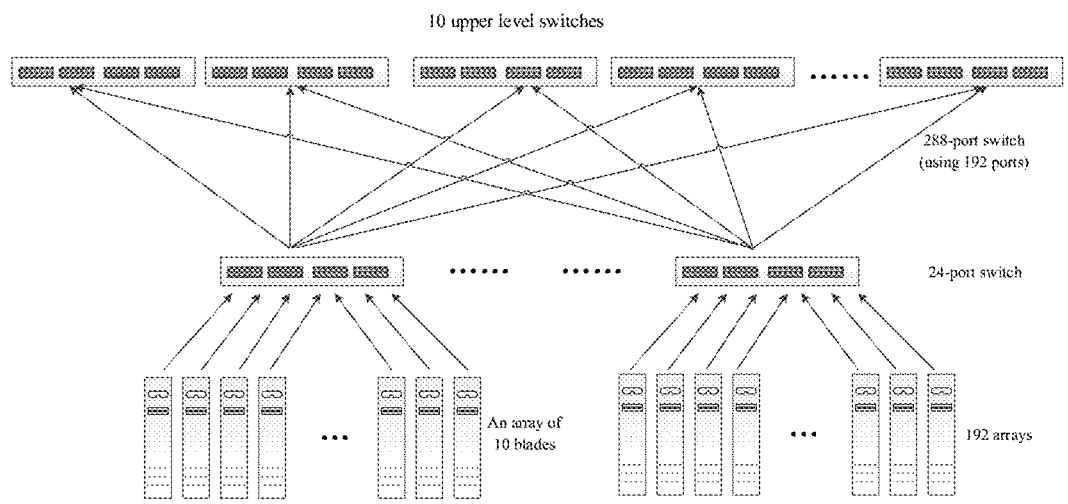
FIG. 1 shows a schematic diagram of a dawning 5000A network topology example.

The description will be made below in the following sequence:
1. an embodiment of a hybrid network system
2. an application embodiment of the hybrid network system on a high performance computer
3. an application embodiment of the hybrid network system on a data center
4. an application embodiment of the hybrid network system on file backup of a distributed system
5. an embodiment of a communication method in the hybrid network system 1. An Embodiment of a Hybrid Network System When writing the present application file, a typical example of a point-to-point communication network is a packet-switched optical fiber network, which is a commonly used network type of the high performance computer network. FIG. 1 shows a schematic diagram of a dawning 5000A network topology example, wherein, each node has 4 quad-core AMD processors, the nodes are connected by an IB network, each array has 10 nodes and is connected to a 24-port switch, 10 lines of each switch are respectively connected to upper level switches, the upper level has 10 288-port switches, and there are 192 arrays, 7680 CPUs and 30720 cores (Core) in total. The point-to-point communication is low in delay (1 us), high in bandwidth (10-100 gbps), but is higher in broadcast and multicast realization costs.

According to the embodiment of the present invention, a hybrid network system is provided, including: a combined network system architecture of a point-to-point network and a broadcast network, wherein the point-to-point network is provided with a plurality of point-to-point channels, each network node can send a message to a corresponding network node or receive the message from the corresponding network node through the point-to-point channel, and wherein the broadcast network is provided with a plurality of broadcast channels, and each broadcast channel can only have one sender at most at the same time, but can have a plurality of receivers; at least a part of network nodes have the capability of sending messages to be broadcast through the broadcast channels, at least a part of network nodes have the capability of receiving the broadcast messages, wherein at least some network nodes are configured to select between the broadcast channels and the point-to-point channels at least according to communication tasks to be executed per se and complete the communication tasks to be executed through the selected channels.

Figure 2:
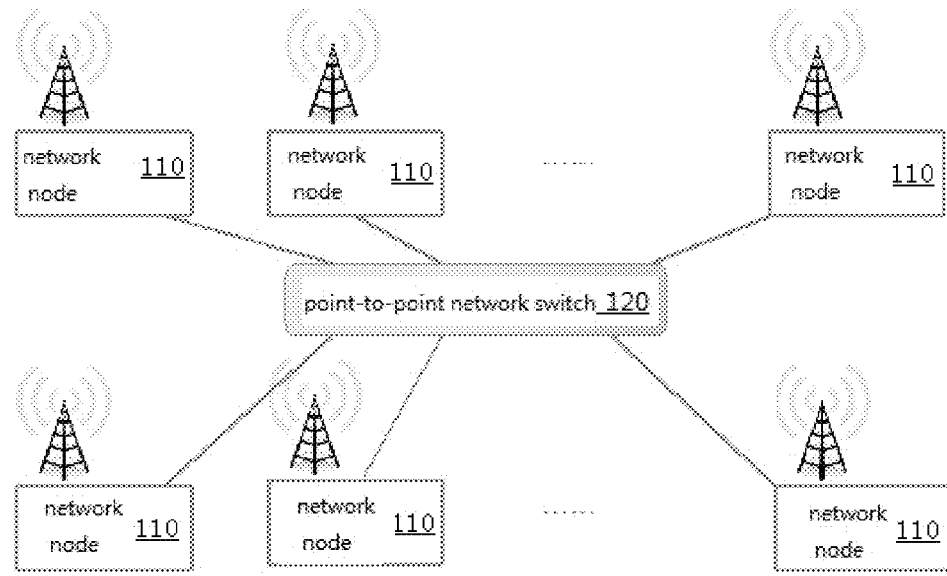
FIG. 2 shows a schematic diagram of a hybrid network of a point-to-point network and a broadcast network according to an embodiment of the present invention.

FIG. 2 schematically shows a schematic diagram of a structure of a hybrid network system 100 according to an embodiment of the present invention.

In the hybrid network system 100 as shown in FIG. 2, any two network nodes among network nodes 110 are connected in a point-to-point manner through a point-to-point network switch 120, and meanwhile each network node 110 has the capability of sending a message to be broadcast and receiving the broadcast message through the broadcast channel.

It should be noted that, the hybrid network system 100 as shown in FIG. 2 is merely an example and should not be deemed as a limitation to the present invention. Actually, more or less network nodes can exist, the network nodes can be organized to a plurality of levels, point-to-point network switches of various levels can exist, and it is possible that not all network nodes have the capability of sending the messages to be broadcast and receiving the broadcast messages through the broadcast channels, for example, it is possible that only one or more network nodes in a local area network have the capability of sending the messages to be broadcast.

Preferably, each network node in the hybrid network system has the capability of sending the message to be broadcast and receiving the broadcast message through the broadcast channel, and each network node is configured to select between the broadcast channels and the point-to-point channels at least according to a communication task to be executed per se and complete the communication task to be executed through the selected channel. For example, as described in details below, in the case of a parallel computer, whether to use the broadcast network or the point-to-point network to send the message can be determined according to the type of the collective operation to be executed.

As an example, the broadcast network can be realized by one of WIFI, a millimeter wave technology and a visible light network. At present, 60 Ghz millimeter wave standard 802.11ad can maximally support a bandwidth of 6.76 Gbps and is expected to support dozens of Gbps in the future. A LIFI technology can provide a communication bandwidth of 10 Gbps magnitude and has the potential of being improved to 100 Gbps magnitude, please see introduction on the following web link http://in.rbth.con/economics/2014/07/01/li-fi_internet_solution_from_russian_company_attracting_foreign_cli_36347.html. Obviously, the bandwidth of a wireless local area network has been basically in the same order of magnitude as a wired network.

As an example, the point-to-point network can be realized by Infiniband or the Ethernet.

In an example, the point-to-point communication is used as a channel for the broadcast network to coordinate and allocate information, this is because, since the broadcast network needs to transmit the information through a wireless channel, and if a plurality of nodes send messages on the same channel, mutual interference will be generated; then which channel each node sends or receives the message on needs to be coordinated by a mechanism, and the completion of the necessary communication of this mechanism can be assisted by the point-to-point communication network.

In an example, each network node can also be configured to determine whether to select the broadcast network to complete a part of broadcast or multicast communication according to the communication traffic and the network use condition.

For example, each network node also being configured to determine whether to select the broadcast network to complete a part of broadcast or multicast communication according to the communication traffic and the network use condition, may include: when carrying out an operation capable of adopting a broadcast algorithm, if the broadcast network is occupied by other operations, whether to wait for the broadcast network to be released or immediately communicate through the point-to-point network at this time is determined according to the occupation condition of the broadcast network and/or the evaluation of benefits capable of being obtained by the specific operation from the broadcast network.

In an example, each network node also being configured to determine whether to select the broadcast network to complete a part of broadcast or multicast communication according to the communication traffic and the network use condition, may include: when carrying out the operation capable of adopting the broadcast algorithm specifically, if the storage space volume of the network node to carry out a broadcast operation does not satisfy the requirements of the operation on the storage space volume, the network node adopts the point-to-point network to realize the certain operation.

In an example, only a part of network nodes in the hybrid network system have the capability of sending the messages to be broadcast through the broadcast channels, when a network node having no capability of sending the message to be broadcast through the broadcast channels needs to broadcast the message to other network nodes, the network node sends the message to a network node having the capability of sending the message to be broadcast through the broadcast channels, and then the network node having the capability of sending the message to be broadcast broadcasts the message to other nodes.

In an example, only a part of network nodes in the hybrid network system have the capability of receiving the broadcast messages, when a network node having no capability of receiving the broadcast message needs to receive the broadcast message from the network nodes, the network node having no capability of receiving the broadcast message obtains the broadcast message through point-to-point communication or memory sharing.

By adopting the hybrid network system according to the embodiment of the present invention, the network architecture simultaneously provided with the point-to-point network and the broadcast network can select the point-to-point network or the broadcast network to complete communication according to the communication needing to be executed for the specific task to be executed, therefore compared with the traditional simple point-to-point network architecture, flexibility can be brought, the communication times are decreased, the necessary communication time is shortened, the pressure of point-to-point communication network resources is relieved, and the application expandability is improved.

The hybrid network system according to the embodiment of the present invention can have a variety of applications. As examples rather than limitations, for example, the hybrid network system can be applied to the field of computers, the field of data centers, the field of distributed file systems and the like, which are respectively illustrated below.

2. An Application Embodiment of the Hybrid Network System on a High Performance Computer An application example of the hybrid network system according to an embodiment of the present invention on the high performance computer will be described below in detail.

For easy explanation, MPI terms are used in the specification sometimes, but the MPI terms should not be deemed as limitation to the present invention.

Inventors have found that the expansion of the parallel computing capability of the parallel computer is often limited by the data communication performance and is particularly limited by the collective operation. With the expansion of the scale of parallel computation, the proportion of communication time in total execution time increases, which is mainly caused by the collective operation. The inventors study the expandability of 7 NPB-E programs and find that when the process number is expanded from 1024 to 16384 (namely, the process number is expanded for 16 times), the speed-up ratios of four programs FT, BT, CG, LU in the 7 NPB-E programs are smaller than 8, wherein the FT program expresses the worst expandability, this is because the communication demand of the FT program is the largest, and multiple times of total exchange (MPI, Alltoall) communication are needed; and the EP program expresses a linear speed-up ratio, this is because no communication operation is carried out in the EP computation process, and the communication function is called once during initialization and termination respectively. In addition, by experiments, the inventors find the GRAPES of a sparse matrix algorithm have the same problems, for example, in the case of 1024 processes, the computation time occupies 67.5% of the total execution time of the program, but when expanding to 2048 processes, the computation time only occupies 39.2%. Therefore, the inventors draw the conclusion that to improve the expandability of the application, the communication performance of the system, particularly the communication performance of the collective operation, must be improved.

Before describing the embodiment of improving the communication performance of the parallel computer system according to the present invention, for the convenience of understanding, a common organization form of the parallel computer, the type of the communication function involved in the parallel computer and the functions thereof are briefly described.

The computing nodes of the parallel computer are organized as at least one computing node working group for the collective parallel operation on the parallel computer. Each working group is a set of the computing nodes for executing the collective operation thereon. The working group can be realized as an MPI "communicator (communicator)". The collective operation is realized by the data communication between the computing nodes of the working group. The collective operation includes those functions involving all the computing nodes in the working group. The operation in the parallel program includes a point-to-point operation and the collective operation. The point-to-point operation is an operation completed by the communication of two computing nodes. The collective operation is an operation executed by all the computing nodes in the working group of the computing nodes simultaneously or approximately simultaneously, and is a message passing computer instruction. The collective operation requires all processes on all the computing nodes in the working group to call the same collective operation with a matching parameter. The MPI point-to-point operation can complete the data exchange between two processes, including blocking communication (MPI_Send, MPI_Recv) and non-blocking communication (MPI_Isend, MPI_Irecv) and the like; and the collective operation can realize the data exchange among a plurality of processes (process groups), including MPI_Barrier, MPI_Bcast, MPI_Allgather, MPI_Alltoall or the like.

Certain collective operations have one initiation process or receiving process executed on a specific computing node in the working group. For example, in the "broadcast" collective operation (e.g., MPI Bcast), the process on the computing node which sends data to all the other computing nodes is the initiation process. In the "gather" collective operation (e.g., MPI Allgather), for example, the process on the computing node which receives all data from the other computing nodes is the receiving process. The computing node executing this initiation or receiving process is referred to as a logic root.

Most collective operations are variations or combinations of the following four basic operations: broadcast (e.g., MPI Bcast), gather (e.g., MPI_gather), scatter (e.g., MPI_Scatter) and reduce (e.g., MPI_reduce). The interfaces of these collective operations are defined in the MPI standard released by the MPI forum. However, an algorithm used for executing the collective operation is not defined in the MPI standard.

In the broadcast operation, all the processes specify the same root process, the buffer contents of the root process are sent, and the processes other than the root process specify a receiving buffer. After the broadcast operation, all the buffers contain the message from the root process.

Just like the broadcast operation, the scatter operation (e.g., MPI_Scatter) is also a one-to-many collective operation. In the scatter operation, the logic root divides the data on the root into a plurality of segments and allocates the segments to the computing nodes in the working group. In the scatter operation, all the processes generally specify the same receive count (receive count). A sending parameter is only meaningful for the root process, the buffer of the root process actually contains sendcount (sendcount)*N elements, wherein N refers to the number of specified processes in the computing node group. The sending buffers are divided and are scattered to all the processes (including the processes on the logic root). Each computing node is allocated with continuous ranks (rank). After the operation, the root sends sendcount data elements to each process according to an ascending order of the process ranks. The process of rank 0 receives sendcount data elements from the sending buffer. The rank 1 receives the next sendcount data elements from the sending buffer, and so on.

The gather operation is a many-to-one collective operation, namely can be deemed as a reverse operation of the scatter operation. That is, the gather is a many-to-one collective operation, wherein elements of one data type are gathered from computing nodes of various levels into the receiving buffer of the root node.

The reduce operation is a many-to-one collective operation, including an arithmetic or logical operation executed on two data elements. All the processes specify the same count (count) and the same arithmetic or logical function. After reduce, all the processes send count data elements from the computing node sending buffer to the root process. In the reduce operation, the data elements from the corresponding sending buffer location are combined in pairs by the arithmetic or logical operation to generate a single corresponding element in the receiving buffer of the root process. A dedicated reduce operation can be defined during execution. A parallel communication library can support a pre-defined operation. For example, the MPI provides the following pre-defined reduce operation: MPI_MAX (figuring out the maximum), MPI_MIN (figuring out the minimum), MPI_SUM (summarizing), MPI_LOR (logic or), etc.

Traditionally, the collective communication is mainly realized by the point-to-point communication, namely, realized by decomposing a collective communication function into the point-to-point communication. The realization policy mainly includes two methods of recursive doubling and binomial tree, and the core idea is to complete the collective communication operation on p processes within log(p) steps by means of the parallelism in the collective communication. The introduction of this aspect can refer to the following literature Zhang J, Zhai J, Chen W, Zheng W Process mapping for mpi collective communications[M]// Euro-Par 2009 Parallel Processing. Springer Berlin Heidelberg, 2009: 81-92.

The application of the hybrid network system according to the embodiment of the present invention on the parallel computer can significantly improve the performance of the collective communication.

As mentioned above, the broadcast (e.g., MPI Bcast), gather (e.g., MPI_gather), scatter (e.g., MPI_Scatter) and reduce (e.g., MPI_reduce) are four basic collective operations.

Among the four basic collective operations, the basic function of gather and the reduce is to gather information, thereby failing to be benefited by broadcast. The complexity of the broadcast (Bcast) and the scatter (scatter) can be reduced by the broadcast, and the performance can be greatly improved. Specifically, a node initiating the broadcast operation can send the contents to all the receiving nodes at one time through a single broadcast, therefore the complexity of the algorithm is reduced from the traditional O(Log(P)) to O(1). With regard to the scatter operation, the node initiating the scatter operation can send all information through a single broadcast, namely sending all the data that are divided into segments, the receiver discards the useless part according to his own demand, instead of the fact that the traditional sender sequentially sends the data of corresponding segments to each receiver process. Obviously, the scatter algorithm of the broadcast network does not save the communication traffic, but greatly saves the communication times, since all the information is received by sending at one time, the receiver discards the useless part according to his own demand, and it is well known to those skilled in the art that a fixed overhead irrelevant to the message size is generated during each message sending, so it is very meaningful to reduce the messaging times.

Other most collective operations are variations or combinations of the four basic operations. Therefore, if the other collective operations can be varied or decomposed to include the broadcast and scatter operations, the communication performance can be improved by the broadcast network in principle. For example, allreduce is equivalent to reduce plus bcast, wherein the reduce part cannot improve the performance through the broadcast and still needs the Log(P) steps, but the bcast part can reduce the complexity from the Log(P) steps to 1 step; and the alltoall needs P steps (wherein, P refers to the number of parallel processes) to be realized on the point-to-point communication network, but under the support of the broadcast network, the alltoall can be decomposed into gather plus scatter, so that the information of all the nodes can be sent to one node (called a master node by us), which needs to be completed by Log(P) steps, and then the broadcast operation is carried out to complete the alltoall. The Allgather operation can also be decomposed into gather and bcast, wherein the gather still needs Log(P) steps, but the bcast can be optimized from the original Log(P) steps to 1 step by the broadcast network.

Figures 3, 4:
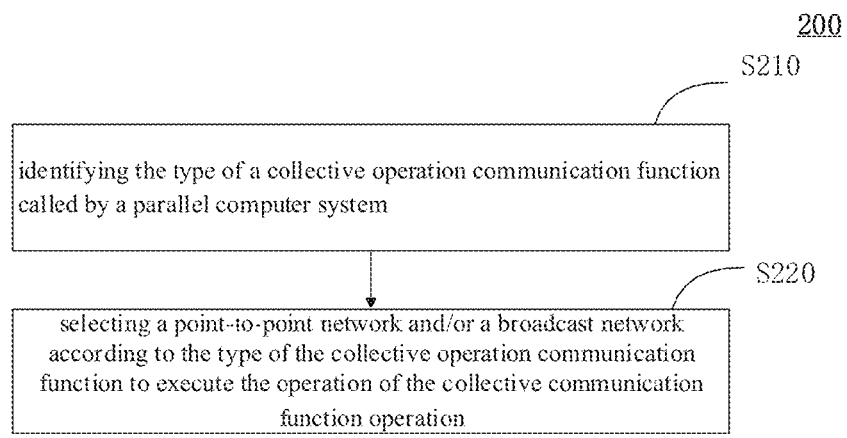
FIG. 3 shows complexity of a common MPI communication operation when only supported by a point-to-point network and when supported by both of a broadcast network and the point-to-point network, wherein P refer to the number of parallel processes.
FIG. 4 shows an overall flowchart of a collective operation execution method 200 for executing a collective operation in a parallel computer according to an embodiment of the present invention.

FIG. 3 shows complexity of a common MPI communication operation when only supported by a point-to-point network and when supported by both of a broadcast network and the point-to-point network, wherein P refer to the number of parallel processes.

It can be seen from FIG. 3 that, as explained above, under the support of the broadcast network and the point-to-point hybrid network, in 8 MPI collective operations:

(1) barrier, gather and reduce basically gather information, thereby failing to be benefited by broadcast;

(2) Bcast, alltoall and scatter can reduce the complexity through the broadcast, thereby having huge performance improvement potential; and (3) although allgather and allreduce cannot reduce the complexity, the introduction of the broadcast network can improve the performance, for example, allreduce is equivalent to reduce plus bcast, wherein bcast can be optimized by the broadcast network.

In an example, whether to select the broadcast network to complete a part of broadcast or multicast communication can be determined according to the communication traffic and the network use condition.

For example, when carrying out the operation capable of adopting the broadcast algorithm specifically, if the storage space volume of the computing node to carry out a broadcast operation does not satisfy the requirements of the operation on the storage space volume, the network node adopts the point-to-point network to realize the certain operation. For example, with regard to MPI_alltoall, as mentioned above, under the support of the broadcast network, the information of all the nodes can be sent to a node (called a master node by us), which needs to be completed by Log(P) steps, and then the broadcast operation is carried out to complete the alltoall. However, there is a premise that all the messages of the MPI_alltoall can be stored in the memory of the master node, when the messages are large and the memory is not large enough, the alltoall cannot be completed by the broadcast network and still needs to be completed by the traditional point-to-point communication network and the algorithm.

As another example, when carrying out a specific operation capable of adopting a broadcast algorithm, if the broadcast network is occupied by other operations, whether to wait for the broadcast network to be released or immediately communicate through the point-to-point network at this time is determined according to the occupation condition of the broadcast network and/or the evaluation of benefits capable of being obtained by the specific operation from the broadcast network, for example, the benefits of broadcasting on 1000 nodes may be larger than that of broadcasting a file transcript to three receivers.

In an example, each computing node is configured to have wireless broadcasting capability and wireless receiving capability, so that the broadcasting capability of a wireless network can be maximally utilized, the communication performance of the collective operation can be improved, and the expansion capability of the parallel computer can be increased.

In another example, it is possible that all the computing nodes have the wireless receiving capability, and only a part of nodes in all the computing nodes have the wireless broadcasting capability, for example, one or more computing nodes in a working group have the wireless broadcasting capability. In this case, when a node having no wireless broadcasting capability needs to broadcast a message to other nodes, the node can send the message to a node having the wireless broadcasting capability, and then the node having the wireless broadcasting capability broadcasts the message to the other nodes.

In another example, it is possible that only apart of nodes in all the computing nodes have the wireless receiving capability, and only a part of nodes in all the computing nodes have the wireless broadcasting capability. In this case, when a node having no wireless broadcasting capability needs to broadcast a message to other nodes, the node can send the message to a node having the wireless broadcasting capability, then the node having the wireless broadcasting capability broadcasts the message to the other nodes, the computing node having the wireless receiving capability obtains the message, and the node having no wireless receiving capability still needs to obtain the message through the point-to-point communication network or in other manners (e.g., memory sharing). For example, a cabinet provided with the high performance computer can have the wireless broadcasting capability and wireless receiving capability, and the communication between the network nodes in the cabinet is realized by the point-to-point network.

In another example, a service node for providing wireless broadcasting services can be specially provided in the parallel computer, all the computing nodes have the wireless receiving capability, the computing nodes can have the wireless broadcasting capability or not, when a certain computing node having no wireless broadcasting capability hopes to broadcast a message to other nodes, the computing node can send the message to be broadcast to the service node (through wired communication or wireless communication or memory sharing), and the service node completes the function of broadcasting the message to other nodes.

In an example, a list of collective operations suitable for improving the communication performance through the broadcast operation can be maintained in each computing node or certain specific computing nodes, so the type of the collective operation called by the parallel computer system is identified, including: checking whether the called collective operation is in the list to judge the type of the collective operation, so as to determine to adopt the point-to-point communication network or the broadcast network or the both to complete the collective operation.

By adopting the high performance computer according to the embodiment of the present invention, since the hybrid network architecture of the point-to-point network and the broadcast network is adopted, the broadcast network realizes or participates to realize the collective operation capable of improving the communication performance by the broadcast, so that the communication performance of the collective operation can be significantly improved to improve the communication performance of the system and enhance the expansibility of the high performance computer.

3. An Application Embodiment of the Hybrid Network System on a Data Center

The application of the hybrid network system structure of the point-to-point network and the broadcast network according to the embodiment of the present invention on the operating system mirror broadcast of a cloud platform with respect to the data center will be described below.

An important application of the data center is to provide could computing service, for example, providing a Linux operating system environment of hundreds of virtual machines for a user. When deploying the virtual machines, virtual machine mirrors often need to be transmitted from a mirror server to a server to be deployed through the network, and some configuration works need to be completed, for example, an IP address and the like are obtained through DHCP. If P virtual machines need to be deployed, the virtual machine mirror transmission can be completed in at least Log(P) steps if only the point-to-point network is adopted, and a large amount of network bandwidth will be occupied, resulting in a slow deployment speed and influencing other applications of the data center. By adopting the hybrid network method of the embodiment of the present invention, the mirrors can be sent by the broadcast network, and the transmission of the virtual machine mirrors can be completed in one step, so that the network overhead of virtual machine deployment is greatly reduced. After the virtual machine mirror transmission is completed, the obtaining of the IP address and other configuration works can be completed through the point-to-point network. The hybrid network system according to the embodiment of the present invention is applied to the operating system mirror transmission of the cloud platform, and compared with the traditional method of transmitting the operating system mirrors through the point-to-point network, the communication performance is significantly improved and the network overhead is reduced.

4. An Application Embodiment of the Hybrid Network System on File Backup of a Distributed System As another example, another application of the hybrid network system structure of the point-to-point network and the broadcast network is file backup of the distributed file system, including: transmitting file contents on a server to two or more other servers through the broadcast network, so that one file at least has three transcripts.

Backup is a common strategy of the distributed file system (e.g., HDFS) for improving the availability and access performance of the file. The common strategy is that each file has three transcripts, and in the case that only point-to-point communication is available, the file contents are required to be transmitted twice through the network. However, by adopting the hybrid network method of the embodiment of the present invention, the file contents only need to be transmitted once by the broadcast network to achieve the three transcripts.

In an example, the hybrid network architecture is used for optimizing the performance of a distributed erasure code storage system.

A distributed erasure code refers to that different parts of a file or a check code thereof is stored on different nodes by the erasure code technology, so that even if a part of nodes have failures, all information of the file can be recovered from the part of file information and the check code stored on the nodes having no failure. Compared with the method of only adopting the file transcript, the distributed erasure code technology can achieve the same fault tolerant capability by less storage capacity.

For example, the 3-transcript technology widely used at present can tolerate the failures of 2 nodes where transcripts are located, but triple storage capacity is needed. A typical erasure code technology can respectively store ⅓ of the contents of the original file on three nodes and store the check code on two additional nodes, the size of the check code is ⅓ of the size of the file, therefore the erasure code technology can achieve the capability of tolerating the failures of two nodes by the 1.67 times of storage capacity of the original file, and thus the storage capacity is greatly reduced in comparison with the transcript system. However, it can be seen that, to adopt the erasure code solution, the original file and the check code need to be passed to other four nodes excluding the nodes owning the original file. Under the hybrid network architecture, the method for passing the file and the check code can be selected according to the size of the file and the bandwidth difference of the broadcast network and the point-to-point network. For example, still taking the storage of the three transcripts of the file as the example, one exemplary implementation method is to send a data distribution solution of the erasure code to four nodes through the point-to-point network at first, then broadcast the file contents to the four nodes through the broadcast network, and the four nodes receive the file contents and voluntarily store a certain part of the file or calculate the check code according to the respective setting in the data distribution solution of the erasure code. In this way, the total data transmission quantity is the size of the original file, and the transmission needs to be performed once. If only the point-to-point network is used, data of 1.33 times as large as the size of the original file are at least transmitted, and the transmission needs to be performed for 4 times.

With the hybrid network system according to the embodiment of the present invention applied to the file backup of the distributed file system, the content transmission times can be greatly reduced. With the hybrid network architecture used for optimizing the performance of the distributed erasure code storage system, the content transmission times can be greatly reduced, the transmitted content quantity is reduced, and the network overhead is lowered.

5. An Embodiment of a Communication Method in the Hybrid Network System

As mentioned above, the hybrid network system according to the embodiment of the present invention includes a combined network system architecture of a point-to-point network and a broadcast network, wherein the point-to-point network is provided with a plurality of point-to-point channels, each network node can send a message to a corresponding network node or receive the message from the corresponding network node through the point-to-point channel, and wherein the broadcast network is provided with a plurality of broadcast channels, and each broadcast channel can only have one sender at most at the same time, but can have a plurality of receivers; and at least a part of network nodes have the capability of sending messages to be broadcast through the broadcast channels, and at least a part of network nodes have the capability of receiving the broadcast messages.

According to the embodiment of the present invention, a communication method applied to the hybrid network system is provided, including: at least some network nodes select between the broadcast channels and the point-to-point channels at least according to communication tasks to be executed and complete the communication tasks to be executed through the selected channels.

In an example, each network node has the capability of sending the message to be broadcast and receiving the broadcast message through the broadcast channel, the communication method includes: each network node selects the broadcast channels and the point-to-point channels at least according to the communication task to be executed per se and complete the communication task to be executed through the selected channel.

A collective operation execution method 200 for executing the collective operation in the parallel computer according to the embodiment of the present invention is described below in combination with FIG. 4.

The parallel computer according to the embodiment of the present invention includes a plurality of computing nodes, and the system structure thereof includes a point-to-point network and a broadcast network.

As shown in FIG. 4, the collective operation execution method according to the embodiment of the present invention can include the following steps:

in step S210, identifying the type of the collective operation called by the parallel computer system; and in step S220, selecting the point-to-point network and/or the broadcast network according to the type of the collective operation to execute the collective operation.

In an example, the type of the collective operation is divided into the following three types: the collective operation is divided into three types according to communication involved in the collective operation, the first type only involves point-to-point communication, the second type only involves broadcast or multicast communication, and the third type involves both of point-to-point communication and broadcast or multicast communication; and the collective operation only involving the point-to-point communication is realized by the point-to-point network, the collective operation only involving the broadcast or multicast communication is realized by the broadcast network, and for the collective operation involving both of the point-to-point communication and the broadcast or multicast communication, the point-to-point communication is realized by the point-to-point network and the broadcast or multicast communication is realized by the broadcast network.

In an example, as mentioned above, whether to select the broadcast network to complete a part of broadcast or multicast communication can be determined according to the communication traffic and the network use condition.

For example, whether to select the broadcast network to complete a part of broadcast or multicast communication is determined according to the communication traffic and the network use condition, including: when carrying out an operation capable of adopting a broadcast algorithm specifically, if the broadcast network is occupied by other operations, whether to wait for the broadcast network to be released or immediately communicate through the point-to-point network at this time is determined according to the occupation condition of the broadcast network and/or the evaluation of benefits capable of being obtained by the specific operation from the broadcast network.

In another example, whether to select the broadcast network to complete a part of broadcast or multicast communication is determined according to the communication traffic and the network use condition, including: when carrying out a specific operation capable of adopting the broadcast algorithm, if the storage space volume of the computing node to carry out a broadcast operation does not satisfy the requirements of the operation on the storage space volume, the network node adopts the point-to-point network to realize the certain operation.

In an example, each computing node in the parallel computer has wireless broadcasting capability and wireless receiving capability, the computing node directly broadcasts a message to other computing nodes per se when necessary, and the other computing nodes directly receive the broadcast message.

In an example, only a part of computing nodes in the parallel computer and/or a special service node has the wireless broadcasting capability, when the computing node having no wireless broadcasting capability needs to broadcast the message to other nodes, the node sends the message to the node having the wireless broadcasting capability, and then the node having the wireless broadcasting capability broadcasts the message to the other nodes.

In an example, only a part of computing nodes in the parallel computer have the wireless receiving capability, and when the computing node having no wireless receiving capability needs to receive the broadcast message from other nodes, the node having no wireless receiving capability indirectly obtains the broadcast message through point-to-point communication or memory sharing.

In an example, if the collective operation is MPI_Bcast or MPI_Scatter, the broadcast network is selected to execute the collective operation.

In an example, if the type of the collective operation is MPI_Allgather, MPI_Alltoall or MPI_Allreduce, the collective operation is decomposed into MPI_Bcast and other collective operations, and with regard to the decomposed MPI_Bcast, the broadcast network is selected to execute the collective operation.

In an example, the broadcast network can be realized by one of WIFI, a millimeter wave technology and a visible light network.

In an example, if the type of the collective operation is MPI_Barrier, MPI_Gather or MPI_Reduce, the point-to-point network is selected to execute the collective operation.

In an example, the point-to-point network can be realized by Infiniband or the Ethernet.

In an example, a list of collective operations suitable for reducing the complexity through the broadcast operation is maintained; and identifying the type of the collective operation called by the parallel computer system includes: checking whether the called collective operation is in the list.

In an example, under the condition of adopting the broadcast network to execute the collective operation, the point-to-point communication network is used as a channel for the broadcast network to coordinate and allocate information.

According to an embodiment of the present invention, a virtual machine deployment method of a data center is further provided, the communication is realized by the hybrid network of the point-to-point network and the broadcast network, and the virtual machine deployment method includes: transmitting a virtual machine mirror from a mirror server to a server to be deployed through the broadcast network.

According to an embodiment of the present invention, a file backup method of a distributed file system is further provided, the communication is realized by the hybrid network of the point-to-point network and the broadcast network, and the file backup method includes: transmitting file contents on a server to two or more other servers through the broadcast network, so that one file at least has three transcripts.

In an example, a distributed erasure code technology is adopted by the file backup method of the distributed file system, the distributed erasure code technology stores different parts of a file or a check code thereof on different nodes, so that even if a part of network nodes have failure, all contents of the file can be recovered from the part of file contents and the check code stored on the nodes having no failure, wherein the data distribution solution of the erasure code is sent to the corresponding network node which is about to store a part of file contents and/or the check code, including: broadcasting all the file contents to the network node which is about to store a part of file contents and/or the check code by the broadcast network; and the network node which is about to store a part of file contents and/or the check code receiving the corresponding data distribution solution of the erasure code, receiving all the broadcast file contents, and then voluntarily storing a certain part of the file or calculating the check code and storing the check code according to the setting in the corresponding data distribution solution of the erasure code.

Various embodiments of the present invention have been described above, and the foregoing description is exemplary, not exhaustive, and is not limited to the disclosed embodiments. On the condition of not departing from the scope or spirit of the embodiments described herein, many modifications, combinations, sub-combinations and alterations are obvious for those of ordinary skill in the art. Accordingly, the protection scope of the claims should prevail over the protection scope of the present invention.

The invention claimed is:

1. A hybrid network system, comprising:
a combined network system architecture including a wired point-to-point network and a wireless broadcast network, and network nodes in the wired point-to-point network and the wireless broadcast network, wherein each of the network nodes includes one or more processors,
wherein the wired point-to-point network is provided with a plurality of point-to-point channels, each of the network nodes being operable to send a message to a corresponding network node or receive a message from the corresponding network node through a point-to-point channel, and the wireless broadcast network is realized by one of WIFI, a millimeter wave technology, and a visible light network,
wherein the wireless broadcast network is provided with a plurality of broadcast channels, and a broadcast channel has one single sender at a time, and has a plurality of receivers; each of the network nodes have capability of sending messages to be broadcast through the broadcast channels, and at least a part of the network nodes have capability of receiving the broadcast messages, and
wherein each of the network nodes is configured to select a channel between the broadcast channels and the point-to-point channels at least according to communication tasks to be executed and complete the communication tasks to be executed through the selected channel,
wherein the hybrid network system is applied to a data center, and the wireless broadcast network is used for operating system mirror broadcast of a cloud platform with respect to the data center,
wherein each network node is further configured to determine whether to select the wireless broadcast network to complete a part of broadcast or multicast communication according to the communication traffic and a network use condition of the wireless broadcast network by:
when carrying out a certain operation capable of adopting a broadcast algorithm, when the wireless broadcast network is being occupied by other operations, determining whether to wait for the wireless broadcast network to be released or immediately communicate through the wired point-to-point network according to an occupation condition of the wireless broadcast network and an evaluation of benefits being obtained by the certain operation from the wireless broadcast network, and
when carrying out a certain operation capable of adopting the broadcast algorithm, when a storage space volume of the network node to carry out a broadcast operation does not satisfy requirements of an operation on the storage space volume, adopting the wired point-to-point network to realize the certain operation.

2. The hybrid network system of claim 1, wherein the wired point-to-point network is used as a channel for the wireless broadcast network to coordinate and allocate information.

3. A communication method in a hybrid network system, the hybrid network system comprises:
- a combined network system architecture including a wired point-to-point network and a wireless broadcast network, and network nodes in the wired point-to-point network and the wireless broadcast network, wherein each of the network nodes includes one or more processors,
- wherein the wired point-to-point network is provided with a plurality of point-to-point channels, each of the network nodes being operable to send a message to a corresponding network node or receive a message from the corresponding network node through a point-to-point channel, and the wireless broadcast network is realized by one of WIFI, a millimeter wave technology, and a visible light network,
- wherein the wireless broadcast network is provided with a plurality of broadcast channels, and a broadcast channel has one single sender at a time, and has a plurality of receivers; each of the network nodes have capability of sending messages to be broadcast through the broadcast channels, and at least a part of the network nodes have capability of receiving the broadcast messages, and
- the communication method comprises: configuring each of the network nodes to select between the broadcast channels and the point-to-point channels at least according to communication tasks to be executed and complete the communication tasks to be executed through the selected channels,
- wherein the hybrid network system is applied to a data center, and the wireless broadcast network is used for operating system mirror broadcast of a cloud platform with respect to the data center,
- wherein each network node is further configured to determine whether to select the wireless broadcast network to complete a part of broadcast or multicast communication according to the communication traffic and a network use condition of the wireless broadcast network by:
- when carrying out a certain operation capable of adopting a broadcast algorithm, when the wireless broadcast network is being occupied by other operations, determining whether to wait for the wireless broadcast network to be released or immediately communicate through the wired point-to-point network according to an occupation condition of the wireless broadcast network and an evaluation of benefits being obtained by the certain operation from the wireless broadcast network, and
- when carrying out a certain operation capable of adopting the broadcast algorithm, when a storage space volume of the network node to carry out a broadcast operation does not satisfy requirements of an operation on the storage space volume, adopting the wired point-to-point network to realize the certain operation.

4. A network node in a hybrid network system, the hybrid network system comprising a combined network system architecture of a wired point-to-point network and a wireless broadcast network, wherein the wired point-to-point network is provided with a plurality of point-to-point channels, the wireless broadcast network is provided with a plurality of broadcast channels, and a broadcast channel has one sender at a time, and has a plurality of receivers, and the wireless broadcast network is realized by one of WIFI, a millimeter wave technology, and a visible light network,
- the network node being operable to send a message to a corresponding network node or receive a message from the corresponding network node through a point-to-point channel, and having capability of sending a message to be broadcast and receiving a broadcast message through a broadcast channel, and
- the network node including one or more processors configured to select between the broadcast channels and the point-to-point channels at least according to a communication task to be executed and complete the communication task to be executed through the selected channel,
- wherein the hybrid network system is applied to a data center, and the wireless broadcast network is used for operating system mirror broadcast of a cloud platform with respect to the data center,
- wherein each network node is further configured to determine whether to select the wireless broadcast network to complete a part of broadcast or multicast communication according to the communication traffic and a network use condition of the wireless broadcast network by:
- when carrying out a certain operation capable of adopting a broadcast algorithm, when the wireless broadcast network is being occupied by other operations, determining whether to wait for the wireless broadcast network to be released or immediately communicate through the wired point-to-point network according to an occupation condition of the wireless broadcast network and an evaluation of benefits being obtained by the certain operation from the wireless broadcast network, and
- when carrying out a certain operation capable of adopting the broadcast algorithm, when a storage space volume of the network node to carry out a broadcast operation does not satisfy requirements of an operation on the storage space volume, adopting the wired point-to-point network to realize the certain operation.

* * * * *